United States Patent [19]

Schoenfelder

[11] 4,223,721
[45] Sep. 23, 1980

[54] HEAT STORAGE CONTAINERS FILLED WITH THE COMBINATION OF A EUTECTIC SALT AND A NON-BIODEGRADABLE FILLER MATERIAL

[75] Inventor: James L. Schoenfelder, Coralville, Iowa

[73] Assignee: Solar, Inc., Iowa City, Iowa

[21] Appl. No.: 836,486

[22] Filed: Sep. 26, 1977

[51] Int. Cl.² ............................................. F28D 21/00
[52] U.S. Cl. .................. 165/104 S; 126/400; 252/70
[58] Field of Search .............. 165/104 S; 126/400; 252/70; 62/529, 530

[56] References Cited

U.S. PATENT DOCUMENTS

| | | | |
|---|---|---|---|
| 2,677,664 | 5/1954 | Telbes | 252/70 |
| 3,060,870 | 10/1962 | Hexdall | 165/104 S X |
| 3,082,611 | 3/1963 | Alvis et al. | 62/530 X |
| 3,986,969 | 10/1976 | Telbes | 252/70 |
| 4,003,426 | 1/1977 | Best et al. | 252/70 X |

Primary Examiner—Albert W. Davis
Attorney, Agent, or Firm—Zarley, McKee, Thomte, Voorhees & Sease

[57] ABSTRACT

A heat storage article adapted for prevention of stratification of heat storage materials, such as eutectic salts contained within the container element. The article is comprised of a heavy thermally conductive container with an internal cavity. The internal cavity of the container is substantially completely filled with a combination of a non-biodegradable filler material such as glass fiber insulation and a eutectic salt.

7 Claims, 4 Drawing Figures

HEAT STORAGE CONTAINERS FILLED WITH THE COMBINATION OF A EUTECTIC SALT AND A NON-BIODEGRADABLE FILLER MATERIAL

BACKGROUND OF THE INVENTION

In recent times, much research effort has been done on solar heat collecting systems. This is primarily so because of the existing fact of a shortage of fossil fuels. Typical solar heat collecting systems comprise a solar collecting panel having an exteriorly exposed sunlight transmitting panel and at least one interiorly disposed sunlight transmitting panel, a solar collecting plate spaced apart from and behind the sunlight transmitting panels and a heat absorption fluid passing behind the collector plate to provide heat exchange with the collector plate itself. In actual operation, the sunlight passes through the sunlight transmitting panels and hits the collector plate. The collector plate converts the solar energy into heat energy; and, the heat absorption fluid which usually passes over one of the surfaces of the collector plate, provides heat exchange with the thermally warmed collector plate. Thereafter, the now heated absorption fluid is typically conveyed away to a remote place within the building structure for storage until it is subsequently utilized to warm the interior of the building.

The collector plates, utilized to convert solar energy to heat energy, are well known and are usually comprised of any suitable metal or like material of high solar absorptivity and are typically painted a dark highly absorptive color such as flat black. Metal from which satisfactory collector plates can be made are copper, aluminum, steel and galvanized iron. Aluminum is perhaps the most commonly used collector.

Heat absorption fluids which pass over the collector plate to provide heat exchange therewith are also known. Typical examples of heat absorption fluids utilized in solar heating systems are water, air, ethylene glycol, propylene glycol and other heat exchange fluids.

The heat produced during the light of the day must be stored so that it can be utilized to provide heating during the night and at times when the sun is not shining. This invention is concerned with an efficient heat storage system.

Many heat storage materials utilized to store heat energy for solar heating systems are phase change materials. That is, the heat storage material undergoes phase changes including changes from solid to liquid form and changes from one crystalline form to another during heat exchange as the heat storage material gains and loses heat. A typical example of a commonly utilized heat storage material which is a phase change material is Glauber's salt.

Normally one would not be concerned with whether or not a heat storage material undergoes phase changes during heat exchange. However, it has been found that many of the more efficient heat storage materials such as Glauber's salt, which have extremely desirable heat storage characteristics, also possess some unique problems. During the fluctuations in temperature involved in the heat exchange between the storage material and the heat absorption fluid, materials such as Glauber's salt undergo stratification. As a result, they form layers of crusted material. This stratification may reduce the heat storage capacity of the material such as Glauber's salt, by more than 50% in a relatively few cycles. Thus, many heat storage materials having extremely desirable heat storage characteristics cannot be utilized successfully because of their inherent stratification problems.

Sodium sulfate decahydrate, commonly known as Glauber's salt, is one example among a class of incongruently melting salts generally referred to as eutectic salts. Others include those listed in the table below.

TABLE 1

| | EUTECTIC SALTS | | | |
|---|---|---|---|---|
| | Melting Temp | Density | Heat of Fusion | |
| Storage Medium | °F. | lb/ft$^3$ | Btu/lb | Btu/ft$^3$ |
| Na$_3$PO$_4$ . 12H$_2$O | 150 | 89 | 82 | 7,300 |
| NaOH . H$_2$O | 148 | 105 | 117 | 12,200 |
| NaC$_2$H$_3$O$_2$ . 3H$_2$O | 136 | 81 | 114 | 9,200 |
| Na$_2$S$_2$O$_3$ . 5H$_2$O | 119 | 103 | 90 | 9,300 |
| Ca(NO$_3$)$_2$ . 4H$_2$O | 117 | 116 | 66 | 7,650 |
| P116 Paraffin Wax | 116 | 49 | 90 | 4,400 |
| FeCl$_3$ . 6H$_2$O | 97 | 101 | 96 | 9,700 |
| Na$_2$CO$_3$ . 12H$_2$O | 97 | 95 | 114 | 10,800 |
| Na$_2$CO$_3$ . 10H$_2$O | 93 | 90 | 108 | 9,750 |
| Na$_2$SO$_4$ . 10H$_2$O | 89 | 91 | 108 | 9,850 |

As previously mentioned during the phase change from solid to liquid, these eutectic salts, and particularly Glauber's salt, are highly useful since the phase change involves a tremendous amount of heat which is either absorbed or rejected during phase change. This heat storage capacity is called "latent heat".

Again, as heretofore mentioned, incongruently melting eutectic salts exhibit a detrimental characteristic called stratification which results in a loss of latent heat storage capacity. For example, with sodium sulfate decahydrate, Glauber's salt, at 90.3° F. the solid crystals melt and change to a saturated solution of 85% sodium sulfate in water and 15% anhydrous sodium sulfate. The anhydrous salt is more dense than the solution; consequently the white granular anhydrous salt settles to the bottom of the container. Increasing the temperature of the solution does not increase solution solubility. Upon continued cycling, three distinct layers can be identified within the container. The bottom layer will be anhydrous sodium sulfate unable to mix with the water, the next layer will be the decahydrate crystals and the top layer will be free water unable to mix with the bottom anhydrous layer.

In the past, there have been several approaches to solving this problem, all meeting with only limited success. For example, wood pulp and sawdust have been experimented with as well as organic thickener, such as silica gel starch and similar gel formers. Such biodegradable organic thickeners are not satisfactory in that they tend to decompose after long periods of time. As a result, stratification is no longer prevented. This invention involves a means of eliminating stratification problems of many desirable heat storage eutectic salts.

Accordingly, an object of this invention is to provide means for utilizing extremely desirable heat storage materials such as Glauber's salt which will avoid the stratification of that material for extended periods of time.

Yet another object of this invention is to provide heat storage articles, which when placed in a storage room allow for adequate air circulation around the individual containers to allow for efficient heat transfer.

Yet another object of this invention is to provide a heat storage unit for solar heating systems which not only provides a maximum heat exchange efficiency without causing stratification problems, but which provides a container which can be used for extended periods of time without detrimental effects caused by biodegradability of the filler materials used in combination with the eutectic salt to prevent stratification.

The method and means of accomplishing these objects, as well as others, will become apparent from the following detailed description of the invention.

DETAILED DESCRIPTION OF THE INVENTION

As heretofore mentioned, Glauber's salt and other phase change salt materials which are useful as latent heat storage materials are classified as incongruently melting substances. This means that as the substance melts or solidifies, it does so by going through intermediate stages. Several melting and freezing cycles separate these intermediate stages, as heretofore described. Thus, after several cycles Glauber's salt itself will actually separate into an anhydrous layer, a hydrated layer, and a water layer.

While the description presented herein is primarily presented in terms of Glauber's salt, it is to be understood that other salts which are desirable heat storage materials also possess the same problems of Glauber's salt and such materials are equally suitable for this invention. Since such materials which can be substituted effectively for Glauber's salt have previously been presented in Table 1, a listing will not be repeated herein.

It has now been found that for reasons not fully understood, that a heat storage material contained within the internal cavity of a container element which is comprised of a highly thermally conductive material, in combination with a substantially inert non-biodegradable filler material of low bulk density, will not stratify during use as a heat storage unit in a solar heating system. Moreover, since the filler material is substantially inert, i.e., non-biodegradable and essentially non-reactive with the eutectic salt, there is no decomposition or deterioration of the ability to prevent stratification after extended usage.

Figure 1:
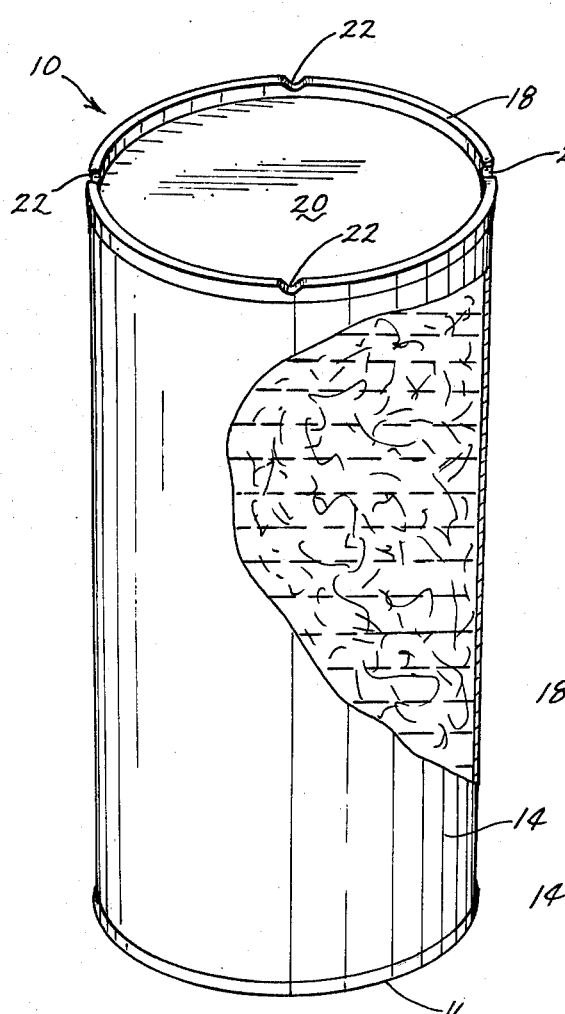
FIG. 1 is a perspective view, with parts broken away of a heat storage container of this invention filled with a combination of a eutectic salt in liquid form and an inert non-biodegradable filler material.

FIG. 1 shows an example of a heat storage container of this invention, referred to generally as 10. It is comprised of a highly thermally conductive container element 12. Container element 12 is much like a pop or beer can. It is comprised of conventional thermally conductive container materials, such as aluminum, or other thin metallic container material. However, lightweight aluminum containers, similar to those used for pop and beer containers, have been found satisfactory. By way of reference, the containers are of substantially the same dimensions as a pop can. The cylindrical container element 12 has a circular cylindrical wall 14, a bottom 16, a top lip 18 which joins together in sealing relationship top 20, and circular wall 14 in conventional fashion. After the containers are sealed, unlike pop cans, however, there is no means of providing entry or access into the interior thereof.

Figure 2:
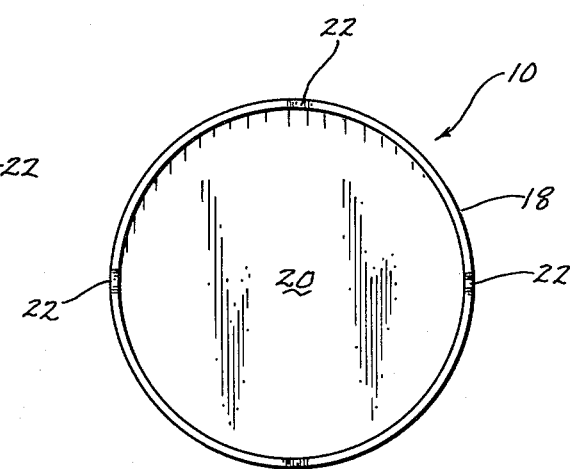
FIG. 2 is a plan view of one of the containers of this invention showing the ventilation indentations on the lip of the container.

As shown in FIG. 2, spaced at each quadrant around the oval shaped top 20 on lip 18, is a slight indentation 22. Indentations 22 are provided in order that air access is provided from the bottom of one can to the top of another to maximize air flow when the containers are stacked one upon the other.

Figure 3:
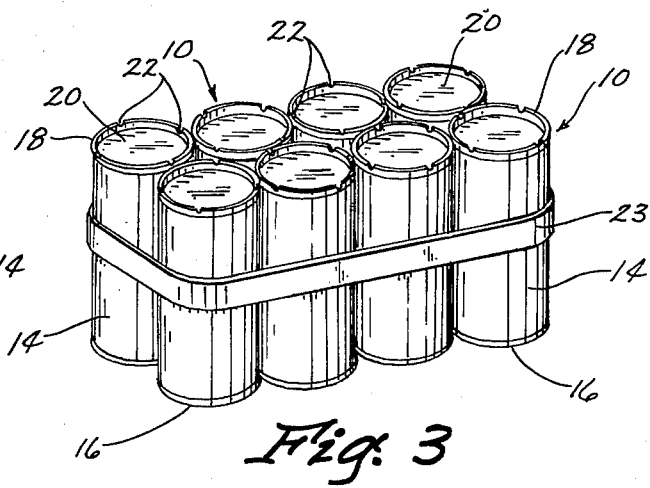
FIG. 3 shows how a series of the individual containers may be banded together for convenient shipment and stacking.

In FIG. 3 there is shown eight of the containers 10 of FIG. 1 bound together by a plastic band 23. It is preferred that such containers are bound in either 6, 8 or 12 packs for convenient movement, storage and shipment.

Figure 4:
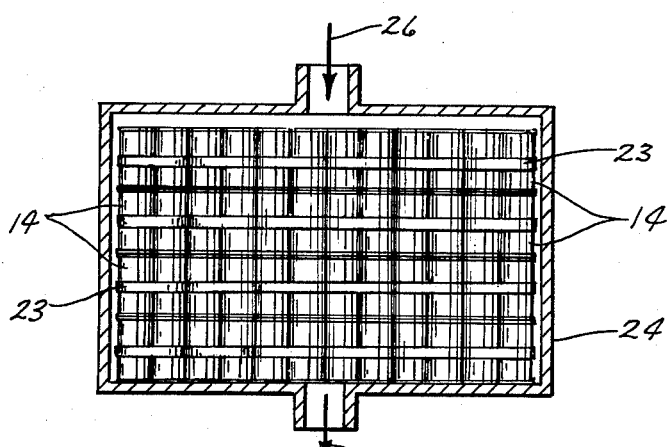
FIG. 4 is a schematic view showing how a storage area may be filled with a plurality of such containers stacked one upon the other.

In FIG. 4 there is shown a storage area in schematic form, 24 having an air inlet 26 and an air outlet 28, with the internal portion of the storage area filled with containers 10 having therein a eutectic salt in combination with a substantially inert non-biodegradable material of low bulk density as described hereinafter.

In making the articles of this invention, the containers 10 are filled with the combination of a eutectic salt in liquid form and a substantially inert non-biodegradable filler material of low bulk density. The term "low bulk density" as used herein is intended to mean that the filler material is of a high degree of resiliency, sort of "spongy" to the feel, and has a large amount of voids therein. The material is placed into the internal cavity of container 12 in this bulk condition and is not compacted. The internal cavity is filled with this material and thereafter the liquid form eutectic salt is poured into the container until it is filled at which point top 20 is placed on the container, and circular sidewall 14 and top 20 are sealed to form the top lip 18.

As heretofore mentioned, it is important to this invention that the filler material be substantially inert and by that term it is meant that it is non-biodegradable after extended use in order to prevent biodegradability and reduction of its effectiveness in combination with the eutectic salt. Therefore the term as used herein substantially inert and non-biodegradable are intended to exclude biodegradable organic materials such as wood filler materials. Materials which are non-biodegradable and can be used herein, include materials such as steel wool, spun glass fiber and the like. It is believed that the inert non-biodegradable filler or stuffing material such as glass fiber or steel wool or other non-biodegradable organic materials such as spun plastics or the like prevent the precipitating of the anhydrous salt form, such as sodium sulfate from settling to the bottom. The strands of glass fiber or other stuffing material also act as a base upon which crystal growth can begin thereby providing much more surface area for crystal growth; consequently increasing the rate of crystal formation and increasing the heat given off during phase change from solid to liquid. Since the anhydrous salt form which may have a tendency to form cannot settle to the bottom, stratification is not found to occur. Moreover, the amount of water formed is also significantly less.

In one example in using the containers of this invention which contain from 10% to 12% glass fiber by volume of the container with the container thereafter being filled to its capacity with liquid Glauber's salt, the containers were cycle tested by alternately bathing the test containers in hot and cold water. An immersible thermometer was used to determine the solution temperatures. The solution was brought to 135° F. and thereafter cooled to 50° F. before test measurements were made. After each cycle for the first 10 cycles, the amount of free water was measured; after which measurements were taken on the 40th and the 89th cycles. Test data developed in this test showed that the test containers of this invention showed after such repeated recycling, less than 12% stratification which was significantly better than comparison with eutectic salts alone as opposed to using those eutectic salts in combination with the filler material of this invention. The container containing only sodium sulfate decahydrate in combination with a nucleating agent showed an amount of free water of in excess of 35% indicating significant stratification.

The amount of low bulk density filler material used in the container in combination with the eutectic salts is not critical but generally should fill from about 10% to about 30% of the volume of the container and most preferably is within the range of from about 10% to about 15% by volume of the container space. Of course, in actual appearance, this small amount of filler material such as insulated fiberglass because of its low bulk density and resiliency or spongy characteristics will appear to fill the container nearly to the top. The remaining volume of the container is filled with the eutectic salt.

As previously mentioned, the cans are stacked one on top of the other in the storage room 24 with the indentations 22 on lip 18 allowing for free air flow between individual cans and also preventing possible moisture condensation between the bottom of one can 16 and the top 20 of another can.

The plastic ring or band 23 is designed to hold the cans approximately one-quarter of an inch apart in order to assure air movement around them when stacked in storage area 24.

What is claimed is:

1. A heat storage article adapted for prevention of stratification of a heat storage material comprising in combination, a container element of a highly thermally conductive material, an internal cavity in said container element, said internal cavity being substantially completely filled with the combination of an inert non-biodegradable bulky material and a eutectic salt, said material being substantially inert when in contact with said eutectic salt, said inert non-biodegradable bulky material being fiber glass insulation, and said material fills from about 10% to about 30% by volume of the internal cavity of said containers.

2. The article of claim 1 wherein said eutectic salt is Glauber's salt.

3. The article of claim 1 wherein said material fills from about 10% to about 15% by volume of the internal cavity of said container.

4. The article of claim 3 wherein said material fills from about 10% to about 12% by volume of the internal cavity of said container.

5. A heat storage article adapted for prevention of stratification of a heat storage material comprising in combination, a container element of a highly thermally conductive material, an internal cavity in said container element, said internal cavity being substantially completely filled with the combination of an inert non-biodegradable bulky material and a eutectic salt, said material being substantially inert when in contact with said eutectic salt, said container being a pop can type container having a sealing lip edge which seals the top to the circular sidewall of the container, said sealing lip having at least two notches formed therein to allow air passage therethrough.

6. The article of claim 5 wherein said inert non-biodegradable bulky material is glass fiber insulation.

7. The article of claim 6 wherein said eutectic salt is Glauber's salt and said material fills from about 10% to about 30% by volume of the internal cavity of said containers.

* * * * *